United States Patent

Ro et al.

[11] Patent Number: 5,903,540
[45] Date of Patent: May 11, 1999

[54] DISK PLAYER HAVING A SELF-CONPENSATING DYNAMIC RING BALANCER

[75] Inventors: Dae-sung Ro; Jin-seung Sohn, both of Suwon, Rep. of Korea

[73] Assignee: Samsung Electronics Co., Ltd., Kyungki-do, Rep. of Korea

[21] Appl. No.: 09/021,128

[22] Filed: Feb. 10, 1998

Related U.S. Application Data

[60] Provisional application No. 60/040,774, Mar. 14, 1997.

[30] Foreign Application Priority Data

Feb. 17, 1997 [KR] Rep. of Korea .................. 97-4766

[51] Int. Cl.⁶ .................. G11B 25/04; G11B 17/02; G11B 19/20
[52] U.S. Cl. .................. 369/263; 360/98.08; 360/99.12
[58] Field of Search .................. 360/98.08, 99.12, 360/98.07; 369/263, 264, 270

[56] References Cited

U.S. PATENT DOCUMENTS

| | | | |
|---|---|---|---|
| 4,203,303 | 5/1980 | Miller | 64/12 |
| 5,422,776 | 6/1995 | Thorson et al. | 360/98.07 |
| 5,537,272 | 7/1996 | Kazmierczak et al. | 360/99.08 |
| 5,540,615 | 7/1996 | Murtuza | 451/343 |
| 5,555,144 | 9/1996 | Wood et al. | 360/98.08 |

*Primary Examiner*—William J. Klimowicz
*Attorney, Agent, or Firm*—Sughrue, Mion, Zinn, Macpeak & Seas, PLLC

[57] ABSTRACT

A disk player having a self-compensating dynamic ring balancer to restrict internal vibrations due to an eccentric center of gravity of a disk, includes a deck base, a deck plate elastically coupled to the deck base, a buffering member interposed between the deck base and the deck plate, a spindle motor coupled to the deck plate and having a stator, a rotor and a rotational shaft, a turntable installed at the rotational shaft, a clamper, and an optical pickup for recording/reproducing information on/from the disk. A self-compensating dynamic ring balancer is coupled to the spindle motor and positions the center of gravity thereof opposite to that of the disk with respect to the rotational shaft during rotation of the disk. Therefore, the revolution of the rotational shaft of the spindle motor due to the eccentric center of gravity of the disk can be reduced.

12 Claims, 6 Drawing Sheets

DISK PLAYER HAVING A SELF-CONPENSATING DYNAMIC RING BALANCER

CROSS REFERENCE TO RELATED APPLICATIONS

This application is an application filed under 35 U.S.C. § 111 (a) claiming benefit pursuant to 35 U.S.C. § 119(e) (1) of the filing date of the Provisional Application 60/040,774 filed Mar. 14, 1997, pursuant to 35 U.S.C. § 111(b) abandoned.

BACKGROUND OF THE INVENTION

1. Field of the Invention

The present invention relates to a disk player and, more particularly, to a disk player having a self-compensating dynamic ring balancer for restricting internal vibrations generated due to an eccentric center of gravity of a disk.

2. Description of the Related Art

A disk player records and/or reproduces information on and/or from a recording medium such as a compact disk (CD), a CD-ROM, or a digital video disk (DVD). Also, it is required to protect a disk or an optical pickup from external impacts and internal vibrations.

As shown in FIG. 1, a conventional disk player includes a deck base 10 hinge-coupled to a housing (not shown) capable of pivoting in a vertical direction, a deck plate 20 coupled to the deck base 10, a spindle motor 21 installed at the deck plate 20 to supply a rotational force to a disk 1, a turntable 23 coupled to a rotational shaft 22 of the spindle motor 21 for accommodating the disk 1, a clamper 40 installed in the housing opposite to the turntable 23 to clamp the disk 1 placed on the turntable 23, and an optical pickup 25 coupled to the deck plate 20 capable of transferring across the disk 1 and performing a recording/reproducing operation.

The disk player includes buffering members 30 disposed between the deck base 10 and the deck plate 20 to prevent the external vibrations transferred through the deck base 10 from being transferred directly to the deck plate 20, the spindle motor 21 and the optical pickup 25. The buffering members 30 are formed of a material such as soft rubber or polyurethane to dampen the external vibrations sufficiently.

The disk player constructed as above can effectively protect the disk 1 and the optical pickup 25 from the external vibrations. However, there is no solution for dampening internal vibrations caused by an eccentric center of gravity of the disk during rotation of the spindle motor 21. In this case, the eccentric center of gravity of the disk is generated from a discrepancy between the rotational center of the disk 1 and the center of gravity of the disk 1 due to errors in the manufacturing process of the disk. Thus, the rotational shaft 22 of the spindle motor 21 revolves because of whirling.

Such revolution of the rotational shaft of the spindle motor does not cause a considerable problem to a low speed model such as a 1X or 2X speed model. However, in the case of a high speed model such as 6X, 8X, 12X or 24X speed models, the effects of the revolution of the spindle motor become serious making recording/reproducing of information difficult.

In consideration of the above problem, in the conventional high speed disk player, the mass of the deck plate where a spindle motor is installed is increased, or the rigidity of the buffering members is increased to reduce movements of the deck plate due to the eccentric center of gravity of the disk. However, the deck plate thus having increased mass is ineffective for a high speed rotation. Also, when the rigidity of the buffering members is increased, it is not possible to effectively dampen the external vibrations or impacts.

SUMMARY OF THE INVENTION

It is an object of the present invention to provide a disk player in which the internal vibrations generated due to the eccentric center of gravity of the disk can be fundamentally dampened by using a self-compensating dynamic ring balancer.

To achieve the above object, there is provided a disk player according to the present invention which includes a deck base, a deck plate elastically coupled to the deck base, at least one buffering member interposed between the deck base and the deck plate to protect the deck plate from external impacts, a spindle motor mounted to the deck plate to provide a rotational force to a disk, the spindle motor having a stator coupled to the deck plate, a rotor installed to be operative to rotate by a mutual electromotive force with the stator, and a rotational shaft extended from the rotor, a turntable installed at the rotational shaft for accommodating the disk, a clamper for clamping the disk seated on the turntable, an optical pickup installed at the deck plate and operative to move across the disk for recording/reproducing information on/from the disk, and a self-compensating dynamic ring balancer coupled to the spindle motor and positioning the center of gravity thereof opposite to that of the disk with respect to the rotational shaft during rotation of the disk, so that revolution of the rotational shaft of the spindle motor due to an eccentric center of gravity of the disk can be reduced.

BRIEF DESCRIPTION OF THE DRAWINGS

The above objects and advantages of the present invention will become more apparent by describing in detail preferred embodiments thereof with reference to the accompanying drawings, in which.

DETAILED DESCRIPTION OF THE PREFERRED EMBODIMENTS

Figure 1:
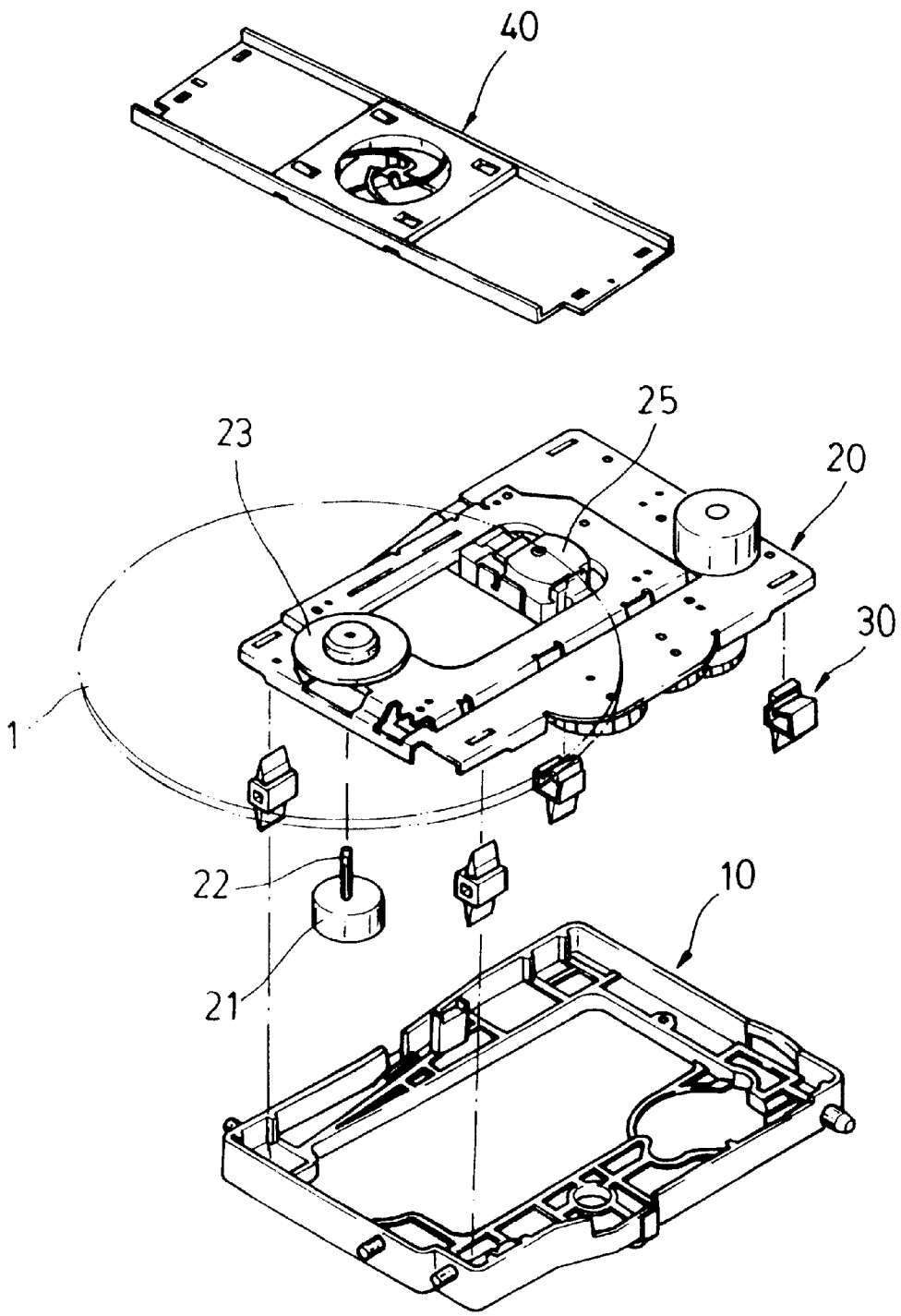
FIG. 1 is an exploded perspective view illustrating a conventional disk player.
Figure 2:
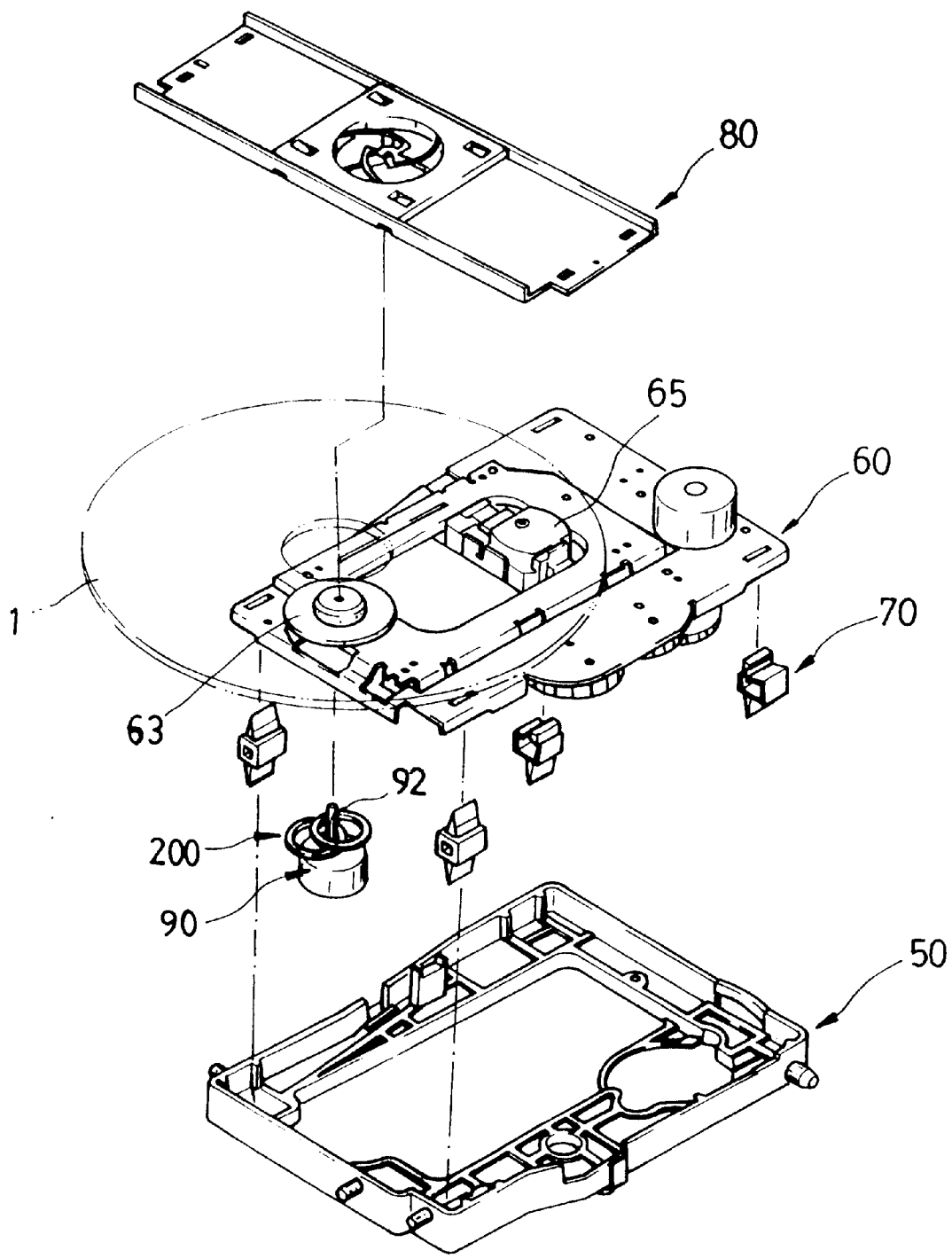
FIG. 2 is an exploded perspective view illustrating a disk player according to an embodiment of the present invention.

As shown in FIG. 2, the disk player according to a preferred embodiment of the present invention includes a deck base 50, a deck plate 60 elastically coupled with the deck base 50, a plurality of buffering members 70 interposed between the deck base 50 and the deck plate 60, a spindle motor 90 mounted to the deck plate 60, a turntable 63, an optical pickup 65, a clamper 80 which holds a disk 1 placed on the turntable 63, and a self-compensating dynamic ring balancer 200 for restricting the revolution of a rotational shaft 92 of the spindle motor 90 generated due to an eccentric center of gravity of the disk 1.

The deck base 50 is hinge-coupled to one side of a housing (not shown) capable of pivoting up and down. The deck plate 60 receives impacts generated from the outside of the deck base 50 which are alleviated by the buffering members 70. Accordingly, it is preferable to reduce the rigidity of the buffering members 70 and the center of gravity of the deck plate 60. The spindle motor 90 provides a rotational force to rotate the disk 1. The turntable 63 is installed concentric with the rotational shaft 92 of the spindle motor 90, and the disk 1 is placed on an upper surface of the turntable 63 during operation. The clamper 80 opposing the turntable 63 is to prevent unnecessary movements of the disk 1 placed thereon. In this case, the spindle motor 90 includes a stator 97 (see FIG. 4), and a rotor 93 (see FIG. 4) facing the stator 97 and having the rotational shaft 92. The rotor 93 is rotated by an external current. The turntable 63 to the rotational shaft 92 rotates as the rotor rotates, and accordingly, the disk 1 and the clamper 80 rotate together.

Figure 3A:
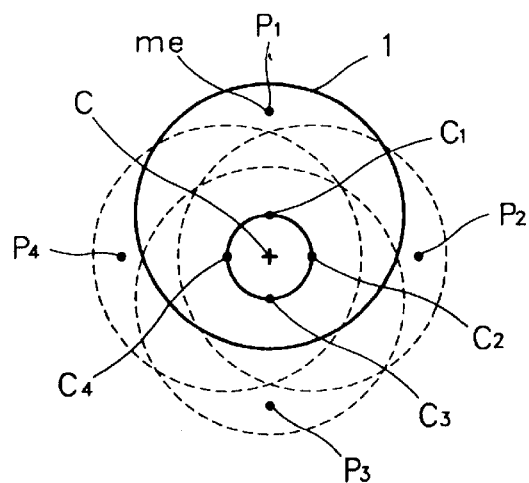
FIGS. 3a, 3b and 3c are diagrams respectively showing the relationship between a position of the eccentric center of gravity of a disk and the center of revolution thereof with respect to a rotation shaft of the disk according to a rotation speed of the disk.
Figure 3B:
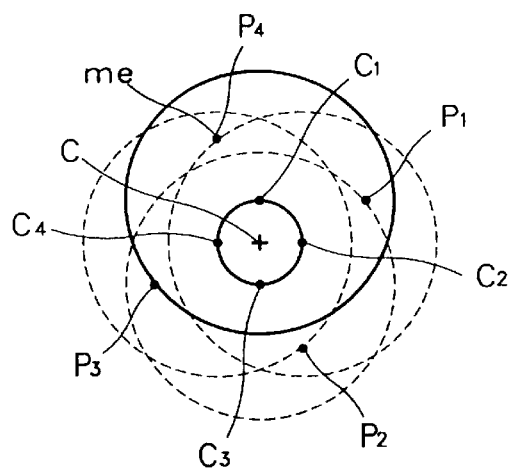
Figure 3C:
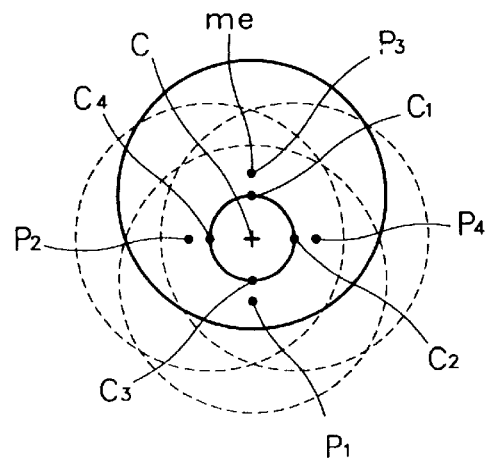

Referring to FIGS. 3a through 3c, the relationship between the eccentric center of gravity of the disk and the center of revolution thereof according to the rotation speed of the disk will be described.

FIG. 3a is a diagram showing the orbital and rotational movements of the disk when the number of rotations of the rotational shaft 92 of the spindle motor 90 is equal to or less than the natural frequency of the deck plate 60. The natural frequency is determined by the elastic modulus of the buffering members 70 and the mass of the deck plate 60 and other elements 63, 65 and 90 to be installed on the deck plate 60, and represents the rate of vibration in a horizontal direction, i.e., in a direction parallel to the plane of the disk 1. As shown in the drawing, when an eccentric center of gravity, $m_e$, exists at a position $p_1$, separated apart by a predetermined distance from a rotation center $c_1$ of the disk 1, the rotation center $c_1$ of the disk 1 revolves around the center c of the revolution transferring to $c_2$, $c_3$ and $c_4$. The positions of the eccentric center of gravity $m_e$ of the disk 1 corresponding to each of the rotation centers $c_2$, $c_3$ and $c_4$ are positions $p_2$, $p_3$ and $p_4$. In this case, the revolution center c and the respective positions $p_1$, $p_2$, $p_3$ and $p_4$ of the eccentric center of gravity $m_e$ of the disk 1 are located opposite to each other with respect to the respective rotation centers $c_1$, $c_2$, $c_3$ and $c_4$ of the disk 1.

FIG. 3b is a diagram showing the orbital and rotational movements of the disk 1 when the number of rotations of the rotational shaft 92 of the spindle motor 90 is similar to the above-described natural frequency. As shown in the drawing, the revolution center c is located perpendicular to the respective positions $p_1$, $p_2$ $p_3$ and $p_4$ of the eccentric center of gravity $m_e$ of the disk 1 with respect to the respective rotation centers $c_1$, $c_2$, $c_3$ and $c_4$.

FIG. 3c is a diagram showing the orbital and rotational movements of the disk 1 when the number of rotations of the rotational shaft 92 of the spindle motor 90 is greater than the above natural frequency. A normal rotation speed of a disk to record/reproduce information on/from the disk belongs in this category, and the revolution center c and the respective positions $p_1$, $p_2$, $p_3$ and $p_4$ of the eccentric center of gravity $m_e$ of the disk are located in the same direction with respect to the respective rotation centers $c_1$, $c_2$, $c_3$ and $c_4$.

In the present invention, it is a characteristic feature that the self-compensating dynamic ring balancer 200 is provided to reduce the eccentricity of the disk by using the relationship between the center of revolution and the eccentric center of gravity of the disk.

The self-compensating dynamic ring balancer 200 is placed around a rotational member of the spindle motor 90, i.e., a rotor 93 (see FIG. 7) or the rotational shaft 92 (see FIG. 4), and has a varying center of gravity during rotation.

Figure 4:
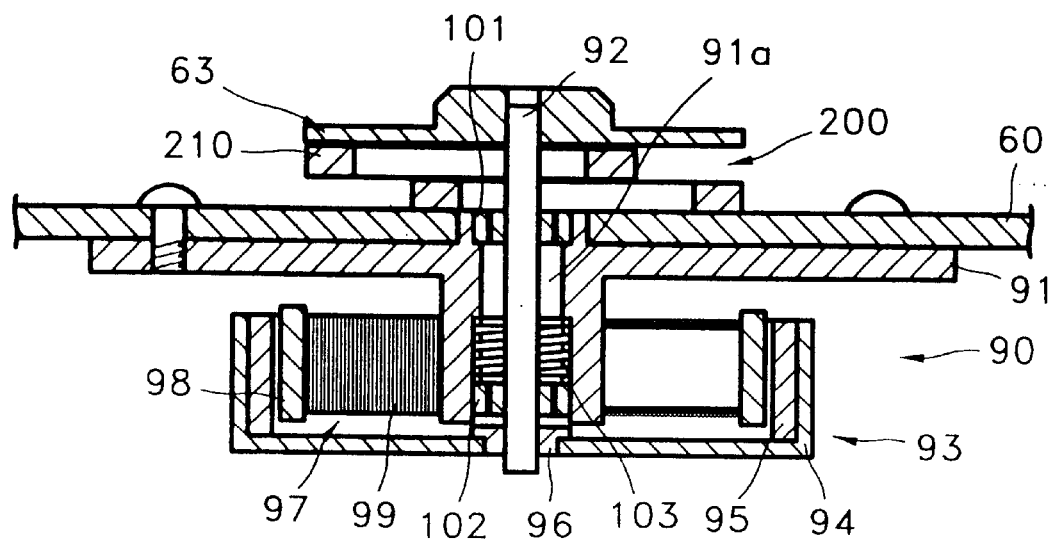
FIG. 4 is a sectional view illustrating a self-compensating dynamic ring balancer according to a preferred embodiment of the present invention.

As shown in FIG. 4, the spindle motor 90 is mounted to the deck plate 60 to rotate the turntable 63 (see FIG. 2) coupled to the rotational shaft 92 thereof.

The spindle motor 90 includes a motor base 91, the rotational shaft 92, the rotor 93, a stator 97 and bearings 101 and 102. The motor base 91 is coupled to the deck plate 60 and has a through-hole 91a inside. The rotational shaft 92 and the bearings 101 and 102 are assembled in the through-hole 91a.

The rotor 93 fixed to one end of the rotational shaft 92 includes a case 94 installed to enclose the stator 97 and a magnet 95 fixed to the inner surface of the case 94. A fixing member 96 is further included at a coupling portion between the case 94 and the rotational shaft 92 to prevent the rotational shaft 92 from slipping away from the case 94 or running idly.

The stator 97 is fixed to the bottom surface of the motor base 91 and includes a yoke 98 facing the magnet 95 and a coil portion 99 around the yoke 98. The bearings 101 and 102 disposed between the through-hole 91a and the rotational shaft 92 are provided to support the rotational shaft 92 in the radial and axial directions. A pair of the bearings 101 and 102 are provided inside the through-hole 91a separated by a predetermined distance. That is, the first bearing 101 has an inner race which is fixed to the rotational shaft 92 and an outer race fixed to the through-hole 91a so that movements of the rotational shaft 92 in radial and axial directions can be restricted. The second bearing 102 is inserted into the through-hole 91a to be capable of sliding therein to prevent the rotational shaft 92 from being slanted. An elastic member 103 is disposed between the first and second bearings 101 and 102 inside the through-hole 91a to dampen rotational vibrations of the rotor 93 transferred to the motor base 91. It is preferable that a metal bearing is used as the bearings 101 and 102 considering the positional accuracy necessary for high speed rotation. Also, it is possible to employ bearing of a different type, i.e., a ball bearing or a dynamic air-pressure bearing.

A first embodiment of the self-compensating dynamic ring balancer 200 according to the present invention will now be described referring to FIGS. 4 to 6.

Figure 5:
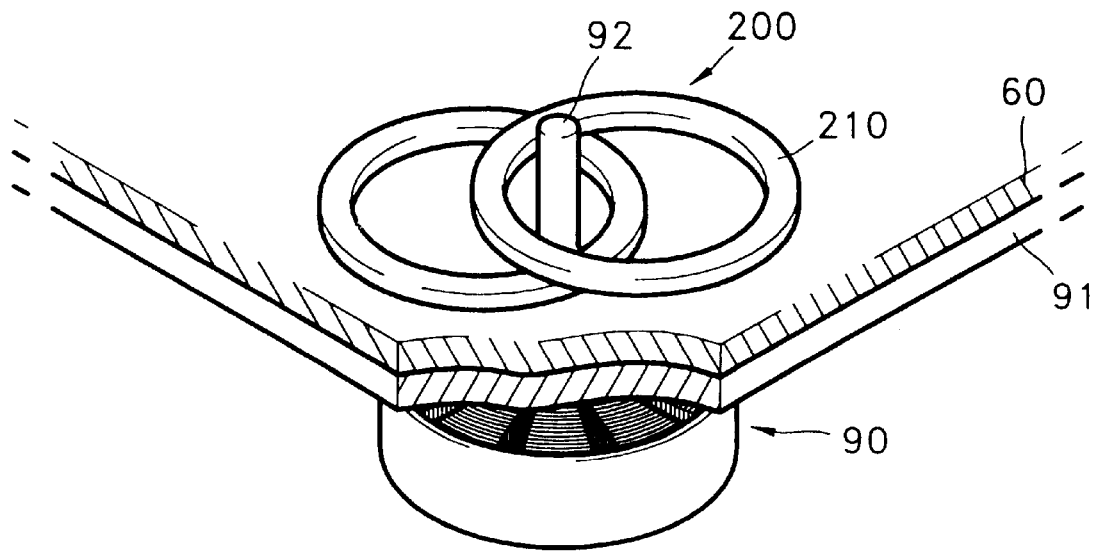
FIG. 5 is a perspective view schematically illustrating the self-compensating dynamic ring balancer shown in FIG. 4 with the turntable uncapped.

As shown in FIGS. 4 and 5, the self-compensating dynamic ring balancer 200 includes at least one pair of rings 210 which is inserted around the rotational shaft 92. Each of the rings 210 is circular, and when the rotational shaft 92 revolves due to the internal vibrations during the rotation of the rotational shaft 92, the rings 210 rotate around the rotational shaft 92 according to the revolution speed while the revolution of the rotational shaft 92 is restricted. The principle of the revolution will be described later. Each of the rings 210 is installed at the rotational shaft 92 between the deck plate 60 and the turntable 63 and has an inner diameter less than that of the turntable 63. Thus, the rings 210 are prevented from escaping from the rotational shaft 92 during operation.

Figure 6:
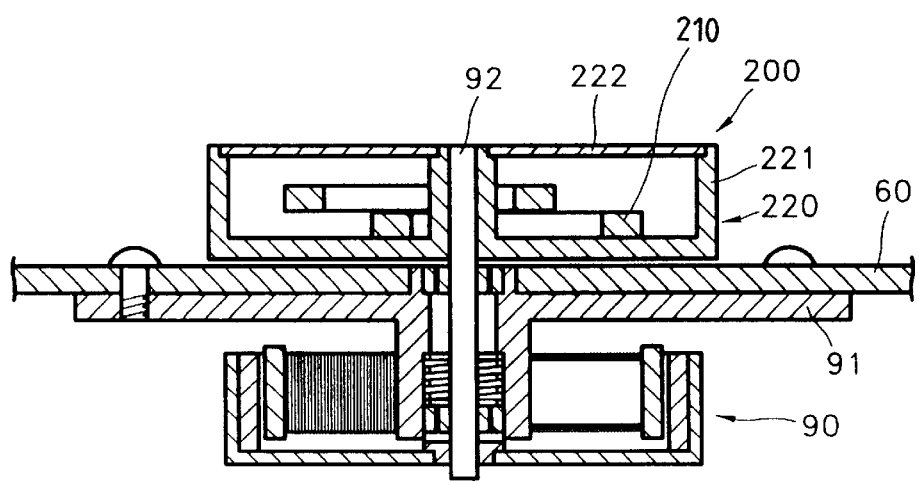
FIG. 6 is a sectional view illustrating a self-compensating dynamic ring balancer according to another preferred embodiment of the present invention.

Also, as shown in FIG. 6, the self-compensating dynamic ring balancer 200 can further include a protecting member fixed to the rotational shaft 92 in order to protect the rings 210. The protecting member prevents the rings 210 from contacting a fixed portion such as the deck plate 60 during rotation thereof. As shown in the drawing, it is preferable that the protecting member is a housing 220 installed at the rotational shaft 92 to enclose the rings 210. That is, the housing 220 includes a housing body 221 installed at the rotational shaft 92 and a cover member 222 coupled with an opening portion of the housing body 221. Also, the protecting member can be a pedestal (not shown) installed at the rotational shaft 92 to support the lower portion of the rings 210.

Figure 7:
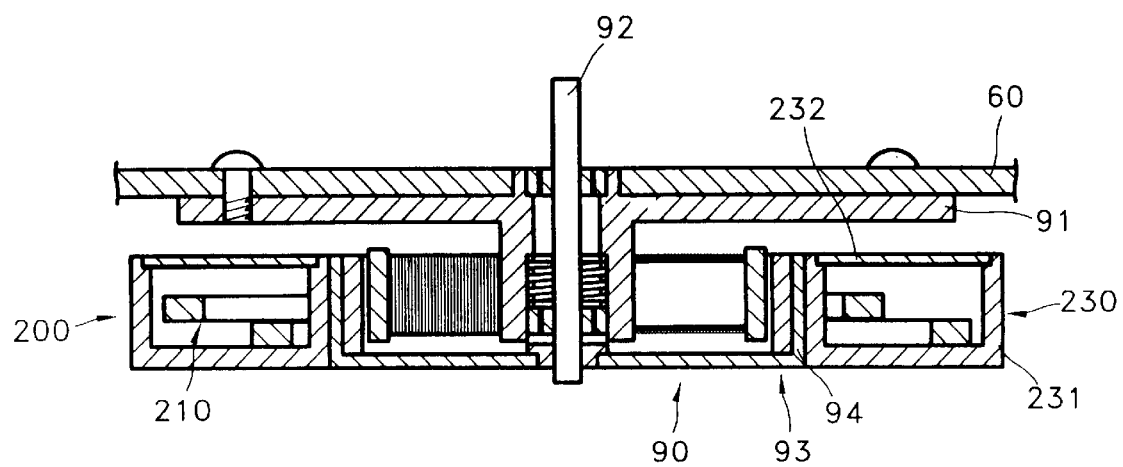
FIG. 7 is a sectional view illustrating a self-compensating dynamic ring balancer according to yet another preferred embodiment of the present invention.

A second embodiment of the self-compensating dynamic ring balancer 200 according to the present invention will be described with reference to FIG. 7.

As shown in the drawing, the self-compensating dynamic ring balancer 200 includes a pair of rings 210 inserted around the case 94 to be capable of moving around the rotor 93, and a protecting member to support the rings 210. The protecting member is mounted to the case 94 to prevent the rings 210 from escaping with respect to the case 94.

It is preferable that the protecting member comprises a housing 230 enclosing the rings 210 as shown in the drawing. That is, the housing 230 includes a housing body 231 installed around the case 94 and a cover member 232 coupled with an opening portion of the housing body 231. Also, the protecting member can be a pedestal (not shown) installed at the case 94 to support the lower portion of the rings 210.

Although a pair of the rings is illustrated in FIGS. 4 through 7 as the self-compensating dynamic ring balancer 200, three or more rings can be provided.

As described above, it is preferable that the self-compensating dynamic ring balancer 200 is formed of a non-magnetic substance to exclude the influence due to magnetic attraction near the balancer. That is, the rings and the protecting member can be formed of a material selected from the group consisting of tungsten carbide WC, beryllium steel CuBe, Hastelloy C-276, silicon nitride $Si_3N_4$, zirconia $ZrO_2$, austenite-series steel YHD50, a non-magnetic metal such as SUS300, SUS304 and SUS316, and ceramic or a synthetic resin.

Also, it is preferable that the ring and/or the protecting member is formed of a non-oxidizing substance such as SUS300, ceramic, and synthetic resin or anti-oxidation coated. The anti-oxidation coating is formed of a material selected from the group consisting of zinc and nickel-chromium which is plated over a base material of carbon steel or chromium steel.

The operation to reduce the eccentric center of gravity of the disk according to the present invention will now be described with reference to FIGS. 2, 8a and 8b.

Figure 8A:
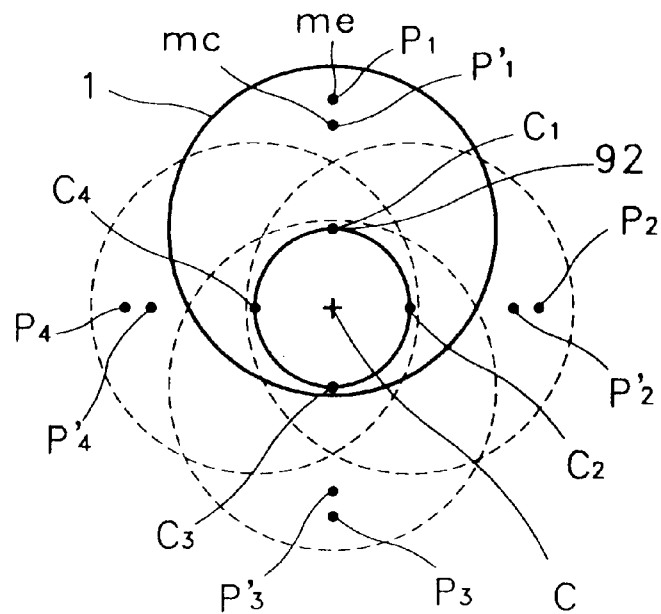
FIGS. 8a and 8b are diagrams respectively showing the relationship between a position of the eccentric center of gravity of a disk and the center of revolution thereof with respect to a rotational shaft according to a rotation speed of the disk of a disk player having a self-compensating dynamic ring balancer according to the present invention.

When the number of rotations of the disk 1 is equal to or less than the natural frequency, as shown FIG. 8a, a position ($p_i$, i=1, 2, 3 and 4) of eccentric center of gravity $m_e$ of the disk 1 and a position ($p'_i$, i=1, 2, 3 and 4) of compensated center of gravity $m_c$, i.e., the center of gravity of the rings 210, are located opposite to the revolution center c, with respect to the corresponding positions ($c_i$, i=1, 2, 3 and 4) of the rotational shaft 92. Thus, the radius of revolution of the rotational shaft 92 becomes large.

Figure 8B:
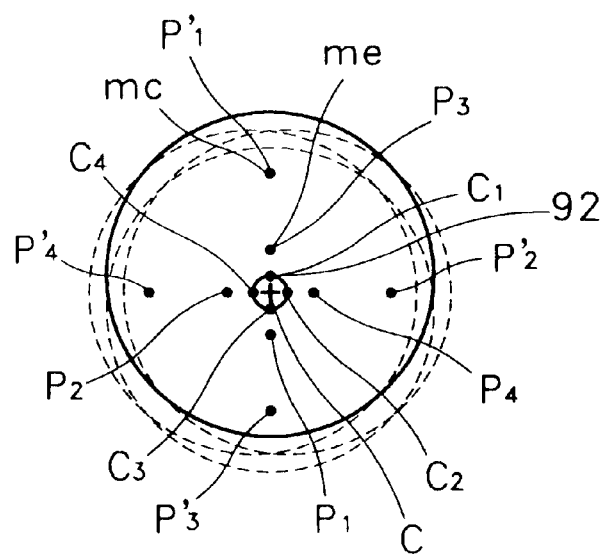

However, when the number of rotations of the disk 1 is much greater than the natural frequency as when the disk rotates at a normal speed, as shown FIG. 8b, the revolution center c and the position ($p_i$, i=1, 2, 3 and 4) of the eccentric center of gravity $m_e$ of the disk 1 are located in the same direction with respect to the rotational shaft 92, and the position ($p'_i$, i=1, 2, 3 and 4) of the compensated center of gravity $m_c$ is located in the opposite direction due to the centrifugal force. Thus, an unbalanced state generated due to the eccentric center of gravity $m_e$ of the disk 1 is compensated for and the radius of revolution of the rotational shaft 92 is drastically reduced. Consequently, the internal vibratory force of the deck plate 60 due to the eccentric center of gravity $m_e$ of the disk 1 is alleviated.

As described above, in the disk player according to the present invention which employs the self-compensating dynamic ring balancer, at least one element of the spindle motor can effectively restrict the internal vibrations when a disk is used exhibiting a great eccentric center of gravity. Also, buffering members exhibiting a weak rigidity can be employed in the inventive disk player thereby to effectively alleviate any external impacts.

It is contemplated that numerous modifications may be made to the disk player of the present invention without departing from the spirit and scope of the invention as defined in the following claims.

What is claimed is:

1. A disk player comprising:
   a deck base;
   a deck plate elastically coupled to said deck base;
   at least one buffering member interposed between said deck base and said deck plate to protect said deck plate from external impacts;
   a spindle motor mounted to said deck plate to provide a rotational force to a disk, said spindle motor having a stator coupled to said deck plate, a rotor installed to be operative to rotate by a mutual electromotive force with said stator, and a rotational shaft extended from said rotor;
   a turntable mounted to said rotational shaft for accommodating the disk;
   a clamper for clamping the disk seated on said turntable;
   an optical pickup installed at said deck plate and operative to move across the disk for recording/reproducing information on/from the disk; and
   a self-compensating dynamic ring balancer coupled to said spindle motor and positioning the center of gravity of said self-compensating dynamic ring balancer opposite to that of the disk with respect to said rotational shaft during rotation of the disk, so that revolution of said rotational shaft of said spindle motor due to an eccentric center of gravity of the disk can be reduced.

2. The disk player as claimed in claim 1, wherein said self-compensating dynamic ring balancer comprises at least a pair of rings placed around said rotational shaft and operative to move around said rotational shaft.

3. The disk player as claimed in claim 2, wherein said self-compensating dynamic ring balancer further comprises a protecting member coupled to said rotational shaft to prevent said rings from being in contact with one of said stator and said deck plate.

4. The disk player as claimed in claim 2, wherein said self-compensating dynamic ring balancer is formed of a non-oxidizing substance which does not corrode.

5. The disk player as claimed in claim 4, wherein said self-compensating dynamic ring balancer is formed of a material selected from the group consisting of SUS300, ceramic and synthetic resin.

6. The disk player as claimed in claim 2, wherein said self-compensating dynamic ring balancer is anti-oxidation coated on an outer surface thereof.

7. The disk player as claimed in claim 6, wherein said anti-oxidation coating is formed of a material selected from the group consisting of zinc and nickel-chromium which is plated over a base material of one of carbon steel and chromium steel.

8. The disk player as claimed in claim 1, wherein said self-compensating dynamic ring balancer comprises:

at least a pair of rings placed around said rotor and operative to move around said rotor; and a protecting member coupled to said rotor for supporting said rings to prevent said rings from escaping with respect to said rotor.

9. The disk player as claimed in claim 8, wherein said self-compensating dynamic ring balancer is formed of a non-oxidizing substance which does not corrode.

10. The disk player as claimed in claim 9, wherein said self-compensating dynamic ring balancer is formed of a material selected from the group consisting of SUS300, ceramic and synthetic resin.

11. The disk player as claimed in claim 8, wherein said self-compensating dynamic ring balancer is anti-oxidation coated on an outer surface thereof.

12. The disk player as claimed in claim 11, wherein said anti-oxidation coating is formed of a material selected from the group consisting of zinc and nickel-chromium which is plated over a base material of one of carbon steel and chromium steel.

* * * * *